July 7, 1936.　　　N. WYETH ET AL　　　2,046,889
SHOCK ABSORBER
Filed May 21, 1932　　　3 Sheets-Sheet 2

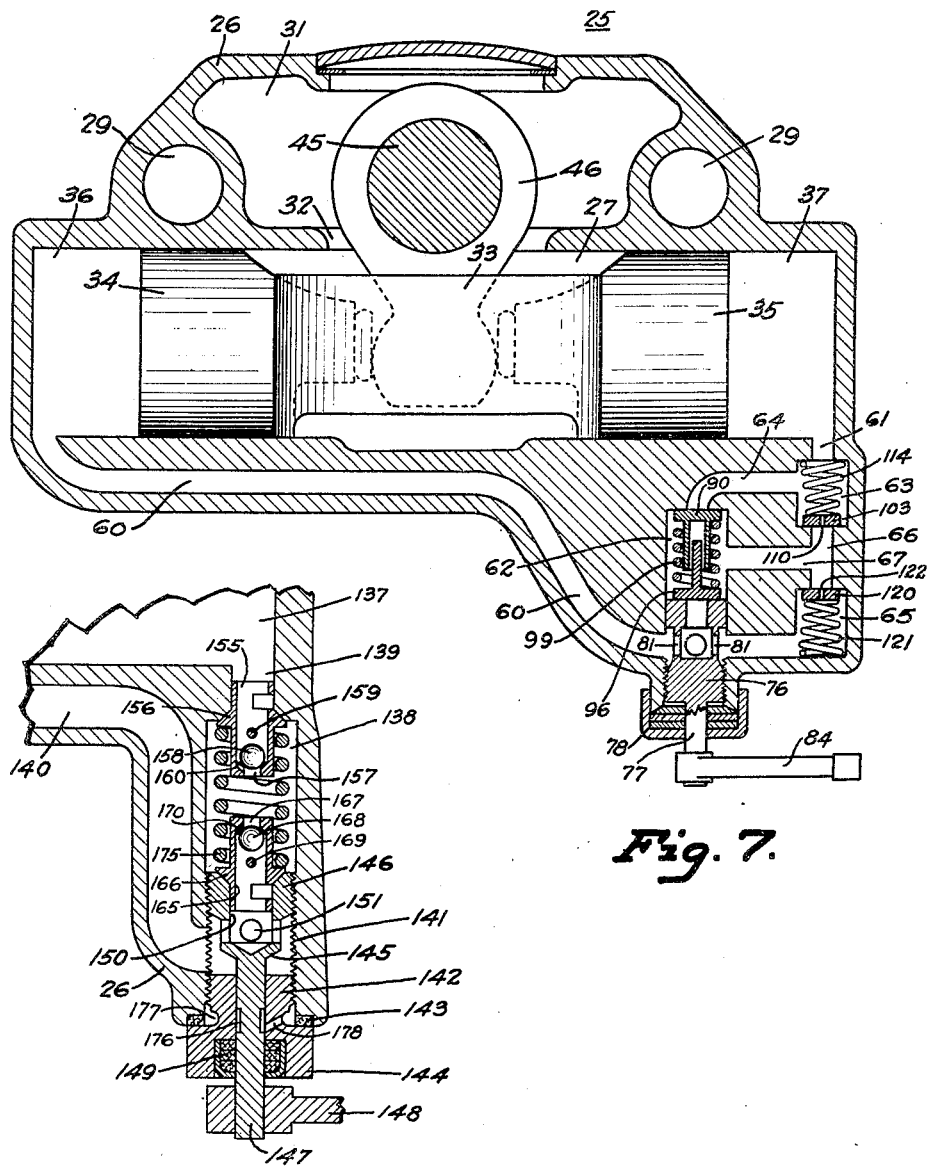

Patented July 7, 1936

2,046,889

UNITED STATES PATENT OFFICE 2,046,889

SHOCK ABSORBER

Nathaniel Wyeth, Detroit, Mich., and Edwin F. Rossman, Dayton, Ohio, assignors, by mesne assignments, to General Motors Corporation, Detroit, Mich., a corporation of Delaware Application May 21, 1932, Serial No. 612,680

35 Claims. (Cl. 188—88)

This invention relates to improvements in hydraulic shock absorbers and particularly to control devices for such type of shock absorbers.

It is among the objects of the present invention to provide a double acting hydraulic shock absorber with fluid control devices which are adapted to be adjusted from outside the shock absorber to vary the resistance of the shock absorber.

Another object of the present invention is to provide a hydraulic shock absorber, having pressure release devices normally urged into closed position by a single resilient means, with an adjusting member adapted to be operated from outside of the shock absorber for compressing or permitting said resilient means to expand, whereby a greater or lesser fluid pressure is required to move said control fluid flow control devices to establish their respective fluid flows, thereby setting the shock absorber increasedly or decreasedly to resist movement of the elements to which it is connected.

Further objects and advantages of the present invention will be apparent from the following description, reference being had to the accompanying drawings wherein a preferred form of embodiment of one form of the present invention is clearly shown.

In the drawings:

Fig. 7 is a diagrammatic view of the shock absorber showing the fluid flow control devices and their connections.

Fig. 8 is a fragmentary view of a modified form of fluid flow control device for the shock absorber.

Figure 1:
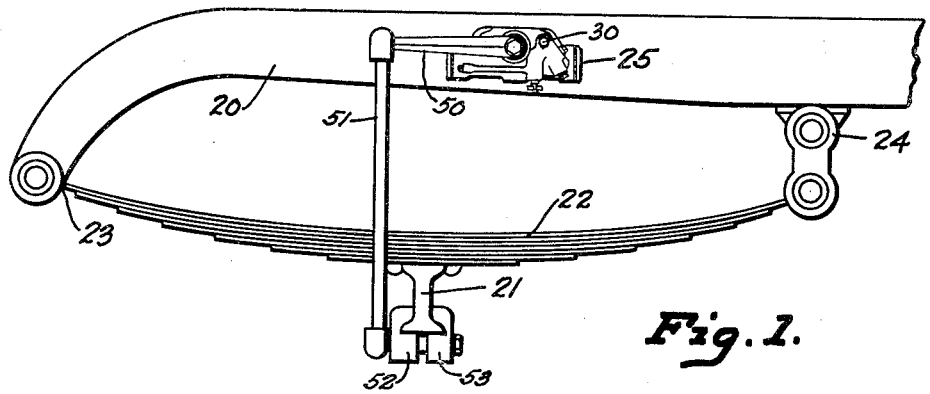
Fig. 1 is a fragmentary side view of a vehicle chassis with the wheel of the vehicle omitted, a shock absorber embodying the present invention being shown applied to the frame of the vehicle.

Referring to the drawings, the numeral 20 in Fig. 1 designates the frame of the vehicle, which is supported upon the vehicle axle 21 by vehicle springs 22, hinged to the frame 20 at the points 23 and 24 respectively. The shock absorber as a whole is designated by the numeral 25. It comprises a casing 26 providing a cylinder 27, both ends of which are closed by cylinder-head caps 28, having proper gaskets for preventing leaks. The shock absorber casing has two holes 29 for receiving bolts 30 by which the casing is secured to the frame 20 of the vehicle. A fluid reservoir 31 is also provided in the shock absorber casing, this reservoir being in communication with the interior of the cylinder 27 through an opening 32.

Figure 3:
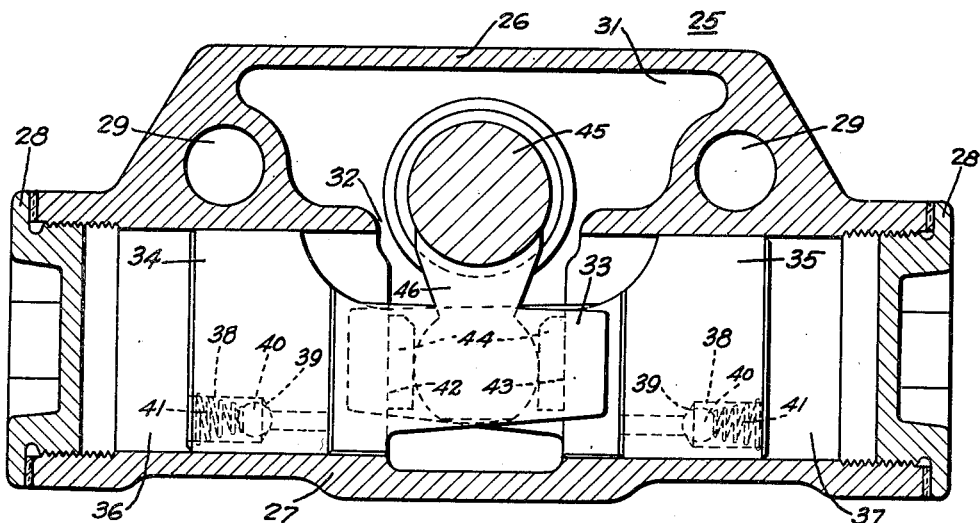
Fig. 3 is a longitudinal sectional view of the shock absorber showing the cylinder, the piston in said cylinder and the piston operating member.
Figure 4:
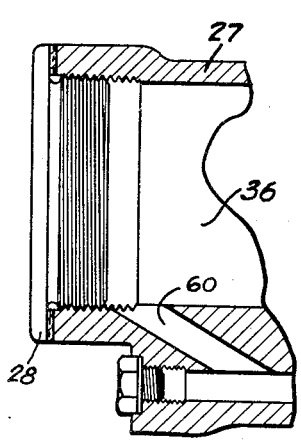
Fig. 4 is a detail fragmentary view of a cylinder portion of the casing showing the duct leading from one of the compression chambers of the shock absorber.

As shown in Fig. 3, a piston 33 is reciprocably supported within the cylinder 27 having oppositely disposed head portions 34 and 35. The piston head 34 forms the spring compression control chamber 36 at one end of the cylinder while the piston head portion 35 forms the spring rebound control chamber 37 at the opposite end of the cylinder. In each piston head portion there is provided a passage 38 furnishing communication between the respective control chamber and the reservoir 31, each passage having a valve seat portion 39 against which a ball check valve 40 is normally urged by a spring 41. These valves 40, in the respective piston head portions 34 and 35, are oppositely acting and provide fluid intake valves which permit fluid to flow from the reservoir 31 through the respective passages 38 into the respective control chambers 36 and 37 as the piston heads move to increase the area of their respective control chambers. A space or opening is provided between the piston head portions 34 and 35 forming oppositely disposed end walls 42 and 43, each end wall being recessed to receive the lug portion of a wear piece 44.

A rocker shaft 45 is supported transversely of the casing said rocker shaft having provided thereon, within the casing, a rocker lever 46, the free end of which extends into the space between the wear pieces 44 on the respective piston head portions 34 and 35 and engages said wear pieces, whereby the piston 33 is operatively connected with the rocker shaft 45.

One end of this rocker shaft 45 extends outside of the shock absorber casing 26 and has the shock absorber operating arm 50 provided thereon, the free end of which is swivelly attached to one end of a link 51. The opposite end of this link is swivelly secured to a member 52 which is clamped to the axle 21 by the clamping member 53. From this it may be seen that the piston 33 is operatively connected with the axle 21 through the following elements: 53, 52, 51, 50, 45 and 46, and consequently movements of the axle 21 toward or away from the frame 20 will reciprocate the piston to the left or right respectively within cylinder 27.

As the piston 33 moves toward the left of the cylinder 27 in response to compression movements of the springs 22, fluid within the spring compression chamber 36 will have pressure exerted thereupon. As the piston moves in the opposite direction in response to the rebound movement of spring 22 the fluid within the spring rebound control chamber 37 will have pressure exerted thereupon. Ducks are provided within the casing which furnish communication between said spring compression and spring rebound control chambers whereby one may be discharged into the other. In these ducts are provided fluid flow control devices for controlling this flow of fluid between said chambers.

Figure 2:
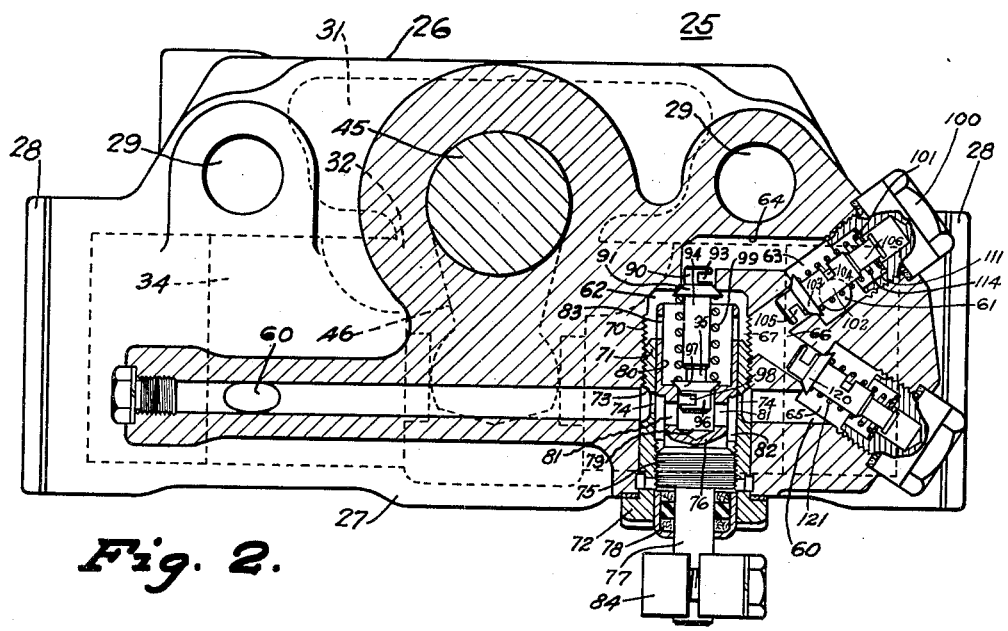
Fig. 2 is a longitudinal sectional view showing the arrangement of the fluid flow control devices.

Referring particularly to Figs. 2 and 7, the duct leading from the spring compression control chamber 36 is designated by the numeral 60. The duct leading from the spring rebound control chamber 37 is designated by the numeral 61. In the casing there is provided a valve chamber 62, one end thereof opening to the outside of the shock absorber, the inner end being in communication with another valve chamber 63 through the passage 64. The passage 64 being of lesser diameter than the valve chamber 62 provides a shoulder at their juncture which forms a valve seat adapted to be engaged by one of the fluid flow control devices. The duct 61 aforementioned, discharges into the valve chamber 63. Another valve chamber 65 is in communication with the duct 60 leading from the spring compression control chamber 36, said duct, however, communicating with valve chamber 62 before it connects with chamber 65. The inner ends of the valve chambers 63 and 65 are in communication with each other through a passage 66, the shoulder formed at the juncture between said passage and the respective valve chambers 63 and 65 forming valve seats in each of said chambers adapted to be engaged by other fluid flow control devices to be described. Passage 66 communicates with the valve chamber 62 through a cross passage 67. From the aforegoing it may be seen that the two compression chambers 36 and 37 are in communication with each other through ducts 60 and 61, said ducts having divided passages 64 and 66 communicating with each other through the valve chamber 62 on one side, and through the valve chambers 63 and 65 on the other, these branch passages 64 and 66 being in communication with each other also through a cross passage 67.

The fluid flow control device within the valve chamber 62 will now be described detailedly. A portion of the inner end of said valve chamber 62 is interiorly threaded, as at 70, for receiving the inner screw threaded end of a valve sleeve or housing 71, the outer end of which has an enlarged head 72 provided with a gasket clamped against the outer surface of the casing. An annular groove 73 is formed in the outer surface of the sleeve 71 and is so positioned that it will communicate with duct 60 when the sleeve 71 is secured within the casing. Cross passages 74 in the sleeve provide communication between the annular groove 73 and the inside of the sleeve or housing 71. Adjacent the outer end of the sleeve there are provided interior threads 75 which are operatively engaged by threads provided on the outer surface of the adjusting member 76. This adjusting member has a stem 77 extending to the outside of the shock absorber, a packing gland 78 surrounding said stem to prevent fluid leaks at this point. The inner end of the adjusting member 76 has two recesses of different diameters, the inner or smaller recess being designated by the numberal 79, the outer and larger recess by the numeral 80. The shoulder between the said recesses forms a valve seat for another of the fluid flow control devices. Cross passages 81 in the recessed adjusting member 76 provide communication between the smaller recess 79 of the said adjusting member and an annular groove 82 in the outer surface of said adjusting member, which annular groove is of such length and so arranged that it is always in communication with the cross passages 74 in the sleeve or housing 71. Near the inner end of the adjusting member 76 the larger diameter recessed portion has side openings 83 which are adapted to provide communication between the inner recess portion 80 and the valve chamber 62 if the adjusting member 76 is moved so that its inner end engages the inner end of said valve chamber. To the stem 77 of the adjusting member 76 there is secured an actuating lever 84 by means of which the adjusting member 76 may be rotated, said rotation, due to the threaded connection between the adjusting member 76 and the stationary valve sleeve or housing 71, causing longitudinal movement of the adjusting member in one direction or the other relative to the said valve sleeve or housing 71. This longitudinal movement of the adjusting member 76 thus moves its valve seat toward or away from the valve seat provided at the opening of the duct 64.

Two telescopically engaging valves are provided within the valve chamber 62, one acting oppositely from the other. The one valve designated by the numeral 90 has a tubular stem 94 provided with an outwardly extending flange 91 which is adapted to engage the annular valve seat at the opening of passage 64 into the valve chamber 62. A side opening 93 in the head portion of the valve extending into the passage 64, acts as a discharge port for the valve when the flange 91 thereof is moved from the valve seat. The tubular stem 94 of the valve telescopically receives the stem 95 of the valve 96 which has an outwardly extending flange 97 adapted to engage the seat provided in the adjustable member 76. The portion of the valve 96 extending into the recess 79 of said adjustable member is hollow, a side opening, similar to opening 93 of valve 90, being provided to facilitate the discharge of the fluid from the recess 79 of the adjustable member 76 into recess 80 when the flange 97 of the valve 96 is moved from its seat. A common spring 99 is interposed between the flange portions 91 and 97 of the said oppositely acting valves 90 and 96, said spring yieldingly urging said valves in opposite directions and normally yieldably maintaining said valves upon their respective seats, thus normally shutting off communication between the valve chamber 62 and the duct 60 and passage 64.

Figure 6:
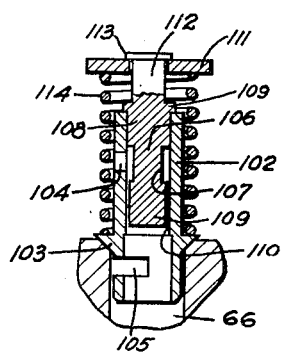
Fig. 6 is an enlarged detail sectional view of one of the check valves of the shock absorber.
Figure 5:
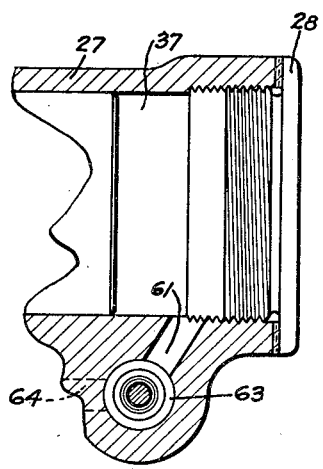
Fig. 5 is a view similar to Fig. 4 showing the duct leading from the other compression chamber of the cylinder.

The check valve within the valve chamber 63 will now be described. Referring particularly to Figs. 2 and 6, the numeral 100 designates a recessed screw plug threadedly received by the interiorly threaded outer end of the valve chamber 63. A shoulder 101 is provided within the screw cap 100, this shoulder being between two recesses of different diameters within said screw cap. The valve comprises a tubular portion 102 having an outwardly extending flange 103 which is adapted to engage the annular valve seat between the valve chamber 63 and the cross passage 66. The portion of the tubular valve extending into the cross passage 66, has a side opening 105 for facilitating the discharge of the fluid through this valve when its flange 103 is lifted from the seat engaged thereby. In the tubular portion 102 there is provided a side opening 104. The tubular portion 102 of the valve receives the valve stem 106, said stem having an annular groove 107 which when in proper position the tubular portion 102 is in communication with the side opening 104. The two portions of the valve stem 106 divided by the annular groove 107 are of different diameters. The one portion 108 is of such a size that it will fit tightly within the tubular valve portion 102, while the portion 109 on the opposite side of the annular groove 107 is of a predetermined lesser size than the inner diameter of the tubular valve portion 102 so as to present an annular orifice 110 within the tubular valve portion 102. A shoulder 109 on the stem engages the outer end of the valve portion 102 properly to position the annular groove 107 of the stem within the said portion 102. A washer 111 fits slidably over the end 112 of the valve stem, the outer portion of 112 being swedged outwardly at 113 to provide a stop for preventing removal of the washer 111 from the valve stem. A spring 114 is interposed between the washer 111 and the flange 103 of the annular valve portion 102. When in position within the valve chamber 63 the washer 111 will engage the shoulder 101 in the recessed screw plug 100 so that when said plug is screwed into the valve chamber 63, spring 114 will be slightly compressed as shown in Fig. 2, whereby to urge the valve 103 into seating engagement within the valve seat within valve chamber 63.

The check valve within the valve chamber 65 is of similar construction and will not be described detailedly. However, for purposes of description this valve will be designated by the numeral 120, and its spring, which urges it normally upon its seat, will be designated by the numeral 121. The orifice provided by the valve will be designated by the numeral 122, this orifice corresponding to the orifice 110 provided in valve 103 (see Fig. 7).

The device described operates in the following manner:

When the wheels of the vehicle strike an obstruction in the roadway, springs 22 will be moved through their compression stroke toward the frame 20 and consequently the link 51 connected to the axle as described heretofore, will move the shock absorber arm 50 in a clockwise direction as regards Fig. 1, resulting in a similar movement of the rocker arm 46. The piston 33 is now being moved toward the left as regards the various figures of the drawings and as a result thereof pressure is exerted upon the fluid within the spring compression control chamber 36, urging said fluid from this chamber through the duct 60 into the valve chamber 62, through the cross passage 74 in the valve sleeve or housing 71 into the annular space formed by annular groove 82 of the said adjusting member 76, thence through cross passage 81 into the recess 79 of the adjustable member 76, through cross passage 84, annular groove 82 and cross passage 74 into the passage portion 60 on the opposite side of the valve chamber 62, finally discharging into the valve chamber 65. From the valve chamber 65 the fluid will enter and pass through the fixed orifice 122 of valve 120 entering passage 66, thence through the fixed orifice 110 of the valve 103 into the valve chamber 63 through duct 61 into the spring rebound control chamber 37. The small size of the fixed orifices 122 and 110 of the respective valves 120 and 103 will so restrict the fluid flow, that the movement of the piston 33 toward the left will be resisted and consequently the compression movement of the spring 22 toward the frame 20 will be resisted. If the pressure upon the fluid in the spring compression control chamber 36 is of predetermined value, or more specifically, if said pressure is of such a degree that it cannot properly be relieved by the fixed orifice 122 and 110 aforementioned then the fluid pressure exerted upon the valve 96 will move said valve against the effect of the spring 99 to open communication between the recess 79 and the recess 80 of the adjusting member 76 thereby establishing the following flow of fluid: from the recess 79 through the hollow end of the valve 96 and its side opening 98 past the valve flange 97, which is now off its seat, into the recess 80, thence from the open end of the recess or through the cross passage 83 into the valve 30 chamber 62, thence through the cross passage 67 into the passage 66, this fluid pressure then lifting valve 103 from its seat against the effect of its spring 114 into the valve chamber 63, through duct 61 into the spring rebound control chamber 37. The fluid flow past the valve flange 97 will be restricted and consequently the compression movement of the spring 22 will correspondingly be resisted.

The spring 22 having reached the limit of its compression movement caused by the striking of certain obstructions in the roadway will then start to move on its rebound stroke away from the frame 20. This causes a reverse movement of the piston 33 or more specifically toward the right as regards all the figures of the drawings and consequently pressure will be exerted upon the fluid within the chamber 37. The first flow of this fluid will be along the same path followed by initial flow of fluid from chamber 36, that is, the initial flow will be established through the restricted passages 110 and 122 of valves 103 and 120 respectively. If the fluid pressure is excessive so that it cannot be relieved by these restricted orifices, then such excessive fluid pressure, exerted through the passage 64 against the valve 90, will move said valve from its seat against the effect of the common spring 99 to establish a flow past this valve into the valve chamber 62, thence into the cross passage 66, lifting valve 120 from its seat and establishing a flow into the valve chamber 65 from whence the fluid will flow through duct 60, cross passages 74 and 81, and the recess 79, thence continuing on its way through duct 66 into the spring compression control chamber 36.

Applicant in the present invention has provided means whereby the shock absorber may be adjusted in accordance with the nature of the road over which the vehicle is being operated. It is a well known fact that while the vehicle is being operated over a comparatively smooth highway or boulevard, especially at comparatively low speeds, the shock absorber should not offer as much resistance to the movements of the vehicle springs or body as it does while the vehicle is being operated over a comparatively rough highway or at substantial increase in speed. When traveling over a comparatively smooth highway or boulevard the vehicle springs will function sufficiently to absorb or cushion the bumps or shocks and should therefore move unresisted, or substantially so.

In the present instance the adjustable member 76 provides a valve seat for one of the pressure release valves in this instance the valve designated by the numeral 96. This adjustable member has an operating lever 84 which may be connected to any actuator within easy reach of the driver of the vehicle so that the driver may actuate the lever 84 while operating the vehicle. When operated in one direction the adjustable member 76 will move into the casing or valve chamber 62 so that the valve 96 is moved toward the valve 90, thus compressing the spring 99 which urges both valves 90 and 96 upon their respective seats. This upward movement of the member 67 thus causes said valves to be urged upon said seats at a greater pressure and thereby requiring a greater fluid pressure to move them from their seat to establish pressure releasing flows. Under this condition, the shock absorber will offer a greater resistance to spring and axle movements and thus provide a stiffer ride. Reverse movement of the adjustable member 76, or more particularly, moving the valve seat of the valve 96 a greater distance from the valve seat of the valve 90, will permit expansion of the spring 99, thus said spring will urge said valves upon their seats at a substantial reduction in pressure and consequently requiring a lesser fluid pressure to move said valves from their seats. This results in a reduced resistance provided by the shock absorber and thus provides for a softer ride, which is preferable while the vehicle is being operated over a comparatively smooth highway or boulevard.

A modified form of fluid flow control device is shown in Fig. 8, which is a fragmentary view of the same type of shock absorber in the other figures. The reference numeral 137 designates the spring rebound control chamber. The valve chamber is designated by the numeral 138. The duct 139 provides communication between the rebound control chamber 137 and the valve chamber 138. The numeral 140 designates the duct which leads from the spring compression control chamber 36, said duct opening into the side of the valve chamber 138. At the one end of the valve chamber 138 interior threads 141 are provided, which receive a screw plug 142, a gasket 143 being provided between the casing 26 and the head 144 of the screw plug to prevent leaks. The adjustable member 145 has a threaded portion 146 operatively engaging the threads 141 in the valve chamber 138. The stem portion 147 of the adjustable member 145 extends through a central passage in the screw plug 144 to the outside of the shock absorber and has the operating lever 148 attached thereto. A packing gland 149 in the screw plug head 144 and about the stem 147 prevents leaks at this point. The inner end of the adjustable member 145 is recessed as at 150. Cross passages 151, in the recessed portion of the adjustable member, provide communication between the valve chamber 138 and duct 140 through the interior of the adjustable member 145. From the aforegoing it may be seen that rotation of the adjustable member 145, due to its threaded connection with its interior threads of the valve chamber 138, will move said adjustable member toward or away from the inner end of said valve chamber 138, and thus the distance between the valve seats provided by the valve chamber 138 and by the adjustable member 145 will be varied.

Two oppositely acting pressure release valves are provided within the valve chamber 138. Both these pressure release valves are of tubular construction, the one designated by the numeral 155 extending into the duct 139 and having a flange 156 adapted to engage the valve seat provided at the point of junction of the duct 139 and the valve chamber 138. The inner end of the valve 155 is restricted as at 157 thereby providing an interior valve seat for the ball check valve 158. A cross pin 159 presents the valve 158 from moving out of the tubular valve 155, it being so spaced in relation with the valve seat of the check valve 158 so that the valve may move from the seat to establish a flow through the valve 155. A slot 160 is cut in the valve seat of the check valve 158 so as to provide a fixed orifice, this orifice being comparable to the orifice 110 of the check valve 103 of the construction shown in the main figures. Another tubular check valve 165 is provided in the valve chamber 138, this valve having an outwardly extending flange 166 adapted to engage the valve seat presented by the adjustable member 145. Like valve 155, it has a restricted inner end portion 167, providing a seat for the ball check valve 168, a cross pin 169 permitting said ball check valve to move a predetermined distance from its seat, but not out of the valve 165. A slot 170 provides a constant orifice for fluid flow past the ball check valve 168.

A single spring 175 is interposed between the flanges 156 and 166 of the respective valves 155 and 165, said spring yieldably urging said valves upon their respective seats.

An annular groove 176 is provided in the stem 147 of the adjustable member 145. An annular groove 177 is also provided in the outer surface of the screw plug portion 142. A passage 178 provides communication between the annular groove 177 of the screw plug 142 and groove 176 in stem 147. The space provided between the annular groove 177 and the wall of the casing 26 is in communication with the reservoir 31 of the shock absorber by any suitable passage in the casing of the shock absorber so that any fluid leaks along the valve stem 147 may be directed through the passage 178 and groove 177 through the passage connecting said groove with the reservoir, thereby preventing the fluid from leaking to the outside of the shock absorber.

This modified construction operates as follows: Upon the compression movement of the piston 33, fluid will flow through the duct 140 entering the valve chamber on the one side of the portion 146 of the adjustable member 145, passing through the cross passages 151 into the recessed portion 150 of the adjustable member. The initial fluid flow will be through the constant orifice 170 presented by the seat of the valve 168 thence through the restricted portion 167 of the valve 165 into the valve chamber 138 thence through the orifice 160 of the valve 158, through valve 155 into the rebound control chamber 137. If the constant orifice 170 cannot properly release this fluid pressure, and if said fluid pressure has reached a predetermined value, it will move valve 165 from its seat against the effect of the spring 175 to establish another flow into the valve chamber 138, this flow continuing through the valve 155 by lifting the ball check valve 158 from its seat and into the rebound chamber 137. Upon reversal of the piston movement pressure will be exerted through the duct 139 through the valve 155, the initial flow being established through the constant orifice 160 provided in the seat of the valve 158, and continuing through the restricted portion 157 of the valve 155 into the valve chamber 138, then moving the valve 168 from its seat and continuing through valve 165 into recess 150, through cross passages 151 into the duct 140 to the spring compression control chamber of the shock absorber. Excessive pressures that cannot be released by the constant orifice 160 will move the valve 155 from its seat against the effect of the common spring 175 to establish another flow into the valve chamber 138.

The effective operation of the pressure release valves may be varied by the rotation of the adjustable member 145 which, as has been described, will move said member toward or away from the valve 155. If moved toward the valve the adjustable member 145 will compress spring 175, thereby requiring a greater pressure to effect the opening of pressure release valves 155 and 165 respectively. If the adjustable member is moved to separate the seats of the two respective pressure release valves, then expansion of the spring 175 is permitted and thus the said valves 155 and 165 are urged upon their seats at a decreased pressure and consequently a lesser fluid pressure is required to open the valves to establish their respective fluid flows.

This modified form of construction operates similarly to the construction shown in Fig. 2. However, in this case the check valves, instead of being separately mounted, are carried within the respective pressure release valves thereby requiring fewer fluid flow passages and also eliminating certain parts, such as springs and screw plugs.

In the present invention applicant has provided a double acting shock absorber adapted to control both the compression and the rebound movements of the frame and axle of a vehicle, the shock absorber having means by which it may be adjusted to provide resistance to body and axle movements in accordance with the nature of the road over which the vehicle is being operated.

While the form of the invention as herein disclosed constitutes a preferred form, it is to be understood that other forms might be adopted, all coming within the scope of the claims which follow.

What is claimed is as follows:

1. A shock absorber comprising, in combination, a casing providing a cylinder and a fluid reservoir; a piston in said cylinder forming two compression chambers therein; a plurality of passages providing communication between said chambers; a plurality of fluid flow control devices normally closing certain of said passages and adapted to establish fluid flows through these passages in opposite directions; a common means yieldably urging said devices to close said passages between the chambers; and means adapted to adjust said common means to vary the effective operation of said devices.

2. A shock absorber comprising, in combination, a casing providing a cylinder and a fluid reservoir; a piston in said cylinder forming two compression chambers therein; a plurality of passages providing communication between said chambers; means providing a constant restriction to the flow of fluid through certain of said passages; a plurality of pressure release valves normally closing other of said passages; a common resilient member yieldably urging said valves into normal position; and means adapted to be operated to vary the pressure of the resilient means upon said pressure release valves whereby said valves are urged into closing position with increased or decreased pressure.

3. A shock absorber comprising, in combination, a casing providing a cylinder and a fluid reservoir; a piston in said cylinder forming two compression chambers therein; means providing communication between said chambers; a plurality of valves in said means certain of said valves being adapted, normally to establish a constantly restricted flow of fluid between said chambers, other of said valves being adapted in response to fluid pressures, to establish another fluid flow through said means in opposite directions; a common spring engaging and urging the other of said valves into normal position; and means accessible from outside the shock absorber for increasing or decreasing the pressure of said spring upon said valves.

4. A shock absorber comprising, in combination, a casing providing a cylinder and a fluid reservoir; a piston in said cylinder forming two compression chambers therein; means providing communication between said chambers; a plurality of valves in said means certain of said valves being adapted, in response to predetermined fluid pressures, to establish fluid flow through said means in opposite directions other of said valves being adapted normally to establish a constantly restricted flow of fluid between said chambers and being adapted also, in response to fluid flow from said first mentioned valve, to complete the flow therefrom; a common spring engaging and urging said first mentioned valves into normal position; and an adjusting member accessible from outside the shock absorber, said member providing a seat for one of the first mentioned valves, and adapted to be operated to vary the distance between said valves whereby the compression of the common spring is varied.

5. A shock absorber comprising, in combination, a casing providing a cylinder and a fluid reservoir; a piston in said cylinder forming two compression chambers therein; a duct having branch passages providing communication between said compression chambers; fluid pressure release valves in the branches of said duct certain of said valves being adapted normally to establish constantly restricted fluid flows through their duct passages, the other valves normally closing their branch passages; a single spring yieldably urging said other valves, normally to close their branch of the duct; and means, threadedly engaging the casing, accessible from outside the shock absorber, and adapted to be operated to vary the compression of said single spring.

6. A shock absorber comprising, in combination, a fluid containing casing providing a cylinder; a piston in said cylinder forming two compression chambers therein; a duct having branch passages for connecting said chambers; fluid pressure release valves in the branch passages of said duct certain of said valves being adapted to establish a constantly restricted flow of fluid between said chambers, other of said valves normally closing their respective branch passages; a spring interposed between said other valves urging them into normal, branch passages closing positions; and an actuator supported by the casing and providing a seat for one of the said other valves, said actuator being adapted to be moved to increase or decrease the pressure of the spring upon the valves.

7. A shock absorber comprising, in combination, a casing providing a fluid reservoir and cylinder; a piston in the cylinder forming two compression chambers therein; a duct connecting said chambers, said duct providing a valve-seat; two oppositely acting pressure release valves in said duct, one of said valves engaging the valve-seat in said duct; a spring interposed between said valves yieldably urging them in opposed directions; an adjustable member extending into the duct and providing a valve-seat for the other valve, said member having a portion operatively connected to the casing so that rotation thereof moves the said member into or out of said duct to increase or decrease respectively the compression of the spring; and an operating lever attached to said member outside the casing.

8. A shock absorber comprising, in combination, a casing providing a fluid reservoir and a cylinder; a piston in said cylinder forming two compression chambers therein; means providing communication between said chambers; and a plurality of primary and secondary fluid flow control devices in said means, the secondary devices each providing fixed orifices to establish restricted fluid flows in either direction through said means, the primary devices moving in response to fluid pressure to establish variable orifices for fluid flows in one direction or the other respectively, through said means, one of said secondary devices moving to complete the flow, only in response to the opening of one of the primary control devices.

9. A shock absorber comprising, in combination, a casing providing a fluid reservoir and a cylinder; a piston in said cylinder forming two compression chambers therein; means providing communication between said chambers; and a plurality of primary and secondary valves in said means, the secondary valves each providing a fixed orifice adapted to establish restricted flows of fluid through said means in either direction without movement of said valves, the primary valves each being adapted to move in response to fluid pressures, to establish a variable flow orifice, one of the secondary valves moving, in response to the fluid flow established by the primary valve, to complete said flow through the communicating means between said chambers.

10. A shock absorber comprising, in combination, a casing providing a fluid reservoir and a cylinder; a piston in said cylinder forming a compression chamber at each end thereof; inter-communicating ducts connecting said compression chambers; oppositely acting, spring-loaded pressure release valves normally closing certain of said ducts; check valves normally closing other of said ducts, said check valves each providing a fixed orifice adapted to establish a restricted flow between the compression chambers in response to reciprocations of the piston, said check valves each diverting fluid pressure against a respective pressure release valve which pressure, when attaining a predetermined value will move said pressure release valve to establish a flow of fluid between the compression chambers, said flow being completed by the movement of one check valve to open its duct.

11. A shock absorber as defined in claim 10, in which means are provided to adjust the pressure release valves to vary their spring load.

12. A shock absorber comprising, in combination, a casing providing a fluid reservoir and a cylinder; a piston in said cylinder forming a compression chamber at each end thereof, each chamber having a passage leading therefrom, the both passages terminating in divided portions, one of said divided portions of a compression chamber passage communicating with the corresponding divided portion of the other passage; a cross duct connecting the two divided portions of said passages; a spring loaded valve in each divided portion of each passage, the valves of each compression chamber passage being oppositely acting and those in the interconnected, divided portion of each of said passages acting oppositely, all of said valves normally closing their passage portions, the valves in the one interconnecting portion of the compression chamber passages each having fixed orifices adapted to establish restricted flows of fluid between the compression chambers without movement of said valves; and means for varying the spring load upon the valves in the other interconnected portion of the compression chamber passages.

13. A shock absorber comprising, in combination, a casing providing a fluid reservoir and a cylinder; a piston in said cylinder forming two compression chambers therein; a duct connecting said compression chambers, said duct providing a divided passage between said chambers forming two channels in parallel connection; two oppositely acting valves in each one of said parallel channels; a single spring urging both valves in one of said channels into normal, channel closing position; a spring on each valve in the other of said channels, normally urging said valves into normal, channel closing position, said springs being comparatively lighter than the single spring of the other valves; a fixed orifice provided by both the valves in one of said channels; and means adapted to be operated to adjust the single spring which controls two valves, to vary its pressure upon said valves.

14. A shock absorber comprising, in combination, a casing providing a fluid reservoir and a cylinder; a piston in said cylinder forming two compression chambers therein; a duct connecting said compression chambers, said duct providing a divided passage between said chambers forming two channels in parallel connection; two oppositely acting valves in each one of said parallel channels; a single spring interposed between the two valves in one of said channels, normally urging said valves into channel closing position; a spring on each valve in the other channel, urging the respective valve into channel closing position, each of said valves having a fixed orifice adapted to establish a fluid flow without valve movement; and an actuating member providing a seat for one of the valves having a spring in common with its adjacent valve, said member being adapted to be operated to move its valve to vary the compression of the spring engaging its valve.

15. A shock absorber comprising, in combination, a casing providing a fluid reservoir and a cylinder; a piston in said cylinder forming a compression chamber at each end thereof; three valve chambers in said casing, each being provided with a valve seat; a duct leading from one compression chamber into one of said valve chambers; a duct leading from the other compression chamber into a second valve chamber;

another duct leading from said second valve chamber into the valve seat of the first valve chamber; another duct leading from said first valve chamber into a third valve chamber; interconnected ducts leading from the first valvechamber into the valve seats of the second and third valve chambers; a spring-loaded valve in each of the second and third valve chambers, normally cutting off communication between their chambers respectively and between the first valve chamber and their respective chambers, each valve having a fixed orifice and being movable to open its chamber only in response to a predetermined fluid pressure in said first valve chamber; oppositely acting valves in said first valve chamber, one of said valves engaging the valve seat in said chamber; an adjustable member extending into said chamber and providing a valve seat for the other valve in said chamber; a spring interposed between said valves urging them upon their respective valve seats; and means for moving the adjustable member to vary the distance between the valves in said first valve chamber for altering the compression of the spring therebetween.

16. A shock absorber comprising, in combination, a casing providing a fluid reservoir and a cylinder; a piston in said cylinder forming a compression chamber at each end thereof; a valve chamber in communication with both compression chambers; a compound valve mechanism in said valve chamber, each mechanism comprising a pressure release valve and a check valve, one acting oppositely to the other, the pressure release valves acting oppositely; a single resilient member urging both pressure release valves into normal position; and means adapted to be operated to vary the compression of the resilient member.

17. A shock absorber comprising, in combination, a casing providing a fluid reservoir and a cylinder; a piston in said cylinder forming a compression chamber at each end thereof; a valve chamber in communication with both compression chambers; two oppositely acting valve mechanisms in said valve chamber, each valve mechanism comprising a tubular pressure release valve and a check valve within said pressure release valve, the pressure release valve being adapted to establish a flow of fluid into said valve chamber and the check valve being movable to establish a flow of fluid from said chamber; a common spring urging both pressure release valves into valve chamber closing position; and a manually operable member adapted to vary the pressure of the spring upon said pressure release valves.

18. A shock absorber comprising, in combination, a casing providing a fluid reservoir and a cylinder; a piston in said cylinder forming a compression chamber at each end thereof; a valve chamber in communication with both compression chambers; a valve seat provided in said valve chamber; a tubular member secured within said valve chamber so as to be movable longitudinally thereof, said member providing a valveseat; an oppositely acting, compound valve mechanism for each valve-seat, each valve mechanism comprising a tubular pressure release valve adapted in response to a predetermined pressure to establish a fluid flow into the valve chamber, and a check valve within said pressure release valve adapted to establish fluid flows out of said valve chamber; a spring interposed between the two pressure release valves normally urging them upon their respective valve seats; and means for actuating the tubular member to move its pressure valve toward or away from the pressure release valve engaging the valve seat provided by the valve chamber, whereby the compression of the spring is adjusted to urge the two pressure release valves upon their respective valve seats at increased or decreased pressure respectively.

19. A shock absorber having a casing providing a cylinder in which a piston forms two compression chambers; means providing communication between said chambers; fluid flow control devices in said means, certain of said devices being adapted normally to establish a constantly restricted flow of fluid between said chambers and other of said devices an additional flow in response to fluid pressure only; and manual means for adjusting said other of said devices to vary their control of another fluid flow between said chambers.

20. A shock absorber having a casing providing a cylinder in which a piston forms two compression chambers; passages providing communication between said chambers; valves adapted to be moved successively by fluid pressure to establish fluid flows in either direction respectively between said chambers, certain of said valves being adapted cooperatively to establish constantly restricted flows between the chambers; and means for adjusting the other valves to vary their control of the fluid flow established by fluid pressure.

21. A shock absorber having a casing providing a cylinder in which a piston forms two compression chambers; a duct connecting said chambers, said duct having branch passages; a pressure release valve and a check valve adapted to be operated successively by fluid pressure to establish a flow of fluid in one direction through said duct; another pressure release valve and a check valve adapted to be operated successively by fluid pressure to establish a flow of fluid in the opposite direction through said duct; means in both check valves, cooperating to establish a constantly restricted flow of fluid in either direction through the duct; and means for adjusting one pressure release valve relatively to the other to vary the effect of both of said pressure release valves upon the fluid flow.

22. A shock absorber having a casing providing a cylinder in which a piston forms two compression chambers; a duct connecting said chambers, said duct having branch passages; a pressure release valve and a check valve adapted to be operated successively by fluid pressure to establish a flow of fluid in one direction through said duct; another pressure release valve and a check valve adapted to be operated successively by fluid pressure to establish a flow of fluid in the opposite direction through said duct; means in both check valves, cooperating to establish a constantly restricted flow of fluid in either direction through the duct; a common spring urging both pressure release valves into normal position, and means for varying the tension of said spring to alter the effect of said pressure release valves upon the fluid flow.

23. A shock absorber having a casing providing a cylinder in which a piston forms two compression chambers; ducts connecting said chambers; means for each of said chambers providing for a constantly restricted flow of fluid from its respective chamber and adapted to be moved to establish a substantially free flow into its chamber; dual means in said ducts, actuated by fluid pressure to establish an additional flow of fluid from each of said chambers respectively; and means for adjusting said last mentioned means to vary the pressure required to actuate said means.

24. A shock absorber having a casing providing a cylinder in which a piston forms two compression chambers; ducts connecting said chambers; fluid flow control means in said ducts for each chamber adapted constantly to restrict the flow of fluid from its respective chamber and permit a substantially free flow into said chamber; spring-loaded means for each chamber, adapted to be actuated by fluid pressure to establish an additional flow of fluid from its respective chamber to the fluid flow control means of the other chamber; and means for varying the tension of the spring-loaded means to regulate the pressure requirements to actuate said means.

25. A shock absorber having a casing providing a cylinder in which a piston forms two compression chambers; ducts connecting said chambers; spring loaded check valves in said ducts adapted normally to provide a constantly restricted fluid flow between said chambers and adapted also to be actuated by fluid pressure to establish a substantially unrestricted fluid flow through said passages; pressure release valves in said ducts adapted to be actuated by fluid pressure to establish fluid flows to the check valves; a spring urging the pressure release valves into normal position and an actuator adapted to move one pressure release valve relative to the other to vary the tension of the spring.

26. In a shock absorber having two fluid displacement chambers and ducts connecting said chambers, the combination with spring-loaded valves, one telescopically engaging the other, for controlling the flow of fluid through said ducts; of an actuator accessible from outside the shock absorber, adapted to be operated to vary the spring load on at least one of said valves.

27. In a shock absorber having two fluid displacement chambers and ducts connecting said chambers, the combination with pressure release valves adapted to establish fluid flows in opposite directions through said ducts; of an actuator accessible from outside the shock absorber for adjusting one of said valves relatively to the other to vary their effect upon the fluid pressure in both of said displacement chambers.

28. In a shock absorber having two fluid displacement chambers and ducts connecting said chambers, the combination with fluid flow control devices for said ducts, one of said devices being supported by the other; of an actuator accessible from outside the shock absorber for adjusting one of said devices relatively to the other to vary their restriction to the flow of fluid between said displacement chambers.

29. In combination with a shock absorber, an adjustable control valve assembly therefor comprising, a housing having a fluid flow passage therethrough, a resiliently seated valve controlling the flow of fluid in one direction in response to the pressure of the fluid, resiliently seated valve means for controlling the flow of fluid in the opposite direction in response to the pressure of the fluid and means adjustable from the exterior of said housing cooperating with at least one of said resiliently seated valve means for controlling the pressure at which said valve means will open in response to the pressure of the fluid, said means including a pair of relatively rotatable cam elements.

30. In combination with a shock absorber, an adjustable control valve assembly therefor comprising, a housing adapted to be secured in the shock absorber and providing a fluid flow passage, a resiliently seated valve controlling the flow of fluid in one direction in response to fluid pressure; resiliently seated valve means for controlling the flow of fluid in the opposite direction in response to fluid pressure; and means adjustable from the exterior of said housing, cooperating with at least one of said resiliently seated valve means for controlling the fluid pressure at which the said valve means will open.

31. In a shock absorber having two fluid displacement chambers and ducts connecting said chambers, the combination with telescopically engaging fluid flow control devices adapted to establish fluid flows through said ducts in opposite directions; of resilient means urging said devices into duct closing position; a movable abutment member adapted to be actuated to vary the tension of said resilient means; and an actuator accessible from outside the shock absorber for actuating the abutment member.

32. In a shock absorber the combination with two inter-connected fluid displacement chambers, of telescopically engaging, spring loaded valves, one of which is adapted to be actuated by fluid pressure to establish a fluid flow in one direction only from one of said chambers; and an actuator accessible from outside the shock absorber for varying the spring tension upon the pressure actuated valve.

33. In an hydraulic shock absorber, the combination with a casing providing a cylinder in which a reciprocative piston forms two displacement chambers, said casing having a recess and ducts connecting each displacement chamber with said recess; of a device comprising a hollow container adapted to be secured in said recess and having openings communicating with said ducts; two spring-loaded valves normally shutting off communication between the ducts; and means within the container and accessible from outside the shock absorber for adjusting the spring load upon at least one of said valves.

34. In an hydraulic shock absorber the combination with a casing providing a cylinder in which a reciprocative piston forms two displacement chambers, said casing having a recess and ducts connecting the two chambers with said recess; of a hollow container secured in said recess and having openings communicating with the ducts; two telescopically engaging, spring-loaded valves normally preventing fluid flow between said ducts; and an actuator within the hollow member and accessible from outside the shock absorber for varying the spring load upon at least one of said valves.

35. In an hydraulic shock absorber having two fluid displacement chambers and ducts connecting said chambers, the combination with a channeled container, attachable to the shock absorber to form an intermediate chamber in communication with said ducts; telescopically engaging, spring-loaded valves for controlling the flow of fluid through said intermediate chambers in two directions; and an actuator accessible from outside the shock absorber for varying the spring load upon at least one of said valves.

NATHANIEL WYETH.
EDWIN F. ROSSMAN.